US012737015B2

(12) United States Patent
Su

(10) Patent No.: US 12,737,015 B2
(45) Date of Patent: Sep. 15, 2026

(54) PIVOT MODULE AND ELECTRONIC DEVICE

(71) Applicant: Wistron Corporation, New Taipei City (TW)

(72) Inventor: Fengcheng Su, New Taipei City (TW)

(73) Assignee: Wistron Corporation, New Taipei City (TW)

(*) Notice: Subject to any disclaimer, the term of this patent is extended or adjusted under 35 U.S.C. 154(b) by 92 days.

(21) Appl. No.: 19/002,661

(22) Filed: Dec. 26, 2024

(65) Prior Publication Data

US 2026/0133609 A1 May 14, 2026

(30) Foreign Application Priority Data

Nov. 13, 2024 (TW) ................................ 113143456

(51) Int. Cl.
*G06F 1/16* (2006.01)
*F16C 11/00* (2006.01)
*F16C 11/04* (2006.01)

(52) U.S. Cl.
CPC ............ *G06F 1/1681* (2013.01); *F16C 11/04* (2013.01)

(58) Field of Classification Search
CPC ............................... G06F 1/1681; F16C 11/04
See application file for complete search history.

(56) References Cited

U.S. PATENT DOCUMENTS

| | | | | |
|---|---|---|---|---|
| 8,929,070 | B2 * | 1/2015 | Liu | H05K 7/20145 165/104.34 |
| 8,937,806 | B2 * | 1/2015 | Senatori | G06F 1/203 361/694 |
| 9,304,558 | B2 * | 4/2016 | Horii | G06F 1/1616 |
| 9,575,524 | B1 * | 2/2017 | Prather | G06F 1/1662 |
| 9,740,253 | B2 * | 8/2017 | Cheng | G06F 1/1681 |
| 10,289,176 | B1 * | 5/2019 | Chen | G06F 1/206 |
| 10,364,598 | B2 * | 7/2019 | Tazbaz | E05D 11/1007 |
| 10,582,638 | B2 * | 3/2020 | Ye | G06F 1/1681 |
| 10,627,874 | B2 * | 4/2020 | Lin | G06F 1/1616 |
| 10,678,312 | B2 * | 6/2020 | Hsu | G06F 1/1656 |
| 11,269,383 | B2 * | 3/2022 | Huang | H05K 7/16 |
| 12,216,493 | B2 * | 2/2025 | Choi | G06F 1/1616 |
| 12,481,317 | B2 * | 11/2025 | Hilliard | G06F 1/1616 |

(Continued)

FOREIGN PATENT DOCUMENTS

CN 111158432 8/2021

*Primary Examiner* — Rockshana D Chowdhury
(74) *Attorney, Agent, or Firm* — JCIPRNET

(57) ABSTRACT

A pivot module including a main shaft, a main connecting member, a sliding member and a movable member is provided. The main connecting member is pivotally disposed to the main shaft, and includes a groove. The sliding member is movably connected to the main shaft and the main connecting member, and includes a second linkage portion and a first driven portion, the second linkage portion is contacted with a first linkage portion of the main shaft. The movable member includes a second driven portion inserted through the groove and contacted with the first driven portion. The main connecting member is used to rotate relative to the main shaft and the sliding member is driven to move on the main shaft, causing the movable member is driven to move relative to the main shaft by the sliding member. In addition, an electronic device including the pivot module is also provided.

20 Claims, 16 Drawing Sheets

(56) References Cited

U.S. PATENT DOCUMENTS 12,498,768 B2* 12/2025 Hilliard ................. G06F 1/1681
12,526,952 B2* 1/2026 Kamezaki ................. G06F 1/20
2011/0292605 A1* 12/2011 Chen ..................... G06F 1/1681 16/303
2012/0113593 A1* 5/2012 Hsu ......................... G06F 1/203 361/696
2013/0308268 A1* 11/2013 Tani ...................... G06F 1/1679 361/679.02
2014/0009888 A1* 1/2014 MacDonald .......... G06F 1/1681 361/701
2017/0153677 A1* 6/2017 Cheng ................... G06F 1/1637
2019/0094918 A1* 3/2019 Lin ....................... G06F 1/1681
2019/0278345 A1* 9/2019 Ye ........................ H05K 5/0234
2019/0317552 A1* 10/2019 Cheng ..................... G06F 1/166
2019/0317561 A1* 10/2019 Cheng ................... G06F 1/1686
2019/0391619 A1* 12/2019 Lin ...................... H05K 5/0226
2020/0133351 A1* 4/2020 Gault .................... G06F 1/1681
2020/0142456 A1* 5/2020 Hsu ....................... G06F 1/1656
2020/0187381 A1* 6/2020 Degner ................... G06F 1/203
2020/0310498 A1* 10/2020 Chiang ..................... E05D 3/18
2020/0319670 A1* 10/2020 Elsey .................... G06F 1/1681
2021/0096618 A1* 4/2021 Radhakrishnan ..... G06F 1/1616
2021/0200269 A1* 7/2021 Chen ..................... G06F 1/1647
2021/0232182 A1* 7/2021 Peng ..................... G06F 1/1616
2022/0171439 A1* 6/2022 Lin ....................... G06F 1/1681
2022/0221913 A1* 7/2022 Huang .................... G06F 1/203
2022/0342455 A1* 10/2022 Wang .................... G06F 1/1681
2023/0068228 A1* 3/2023 Sanchez ................ G06F 1/1681
2023/0189472 A1* 6/2023 Wang ................. H05K 7/20409 361/695
2023/0213982 A1* 7/2023 Huang .................... F16C 11/04 361/679.27
2024/0036621 A1* 2/2024 Kim ..................... H01Q 1/2266
2024/0385654 A1* 11/2024 Ku .......................... G06F 1/166
2024/0420869 A1* 12/2024 Liu ....................... G06F 1/1681
2025/0110532 A1* 4/2025 Yang ..................... G06F 1/1616
2025/0208664 A1* 6/2025 Hilliard ................. G06F 1/1616
2025/0251765 A1* 8/2025 Wang .................... G06F 1/1616
2025/0390152 A1* 12/2025 Zou ......................... G06F 1/203
2026/0050300 A1* 2/2026 Lu ......................... G06F 1/1681
2026/0133609 A1* 5/2026 Su ......................... G06F 1/1681

* cited by examiner

PIVOT MODULE AND ELECTRONIC DEVICE

CROSS-REFERENCE TO RELATED APPLICATION

This application claims the priority benefit of Taiwan application serial no. 113143456, filed on Nov. 13, 2024. The entirety of the above-mentioned patent application is hereby incorporated by reference herein and made a part of this specification.

BACKGROUND

Technical Field

The disclosure relates to a module and a device, and particularly relates to a pivot module and an electronic device including this pivot module.

Description of Related Art

The modern electronic device (for example, the laptop computer) includes two bodies that may be relatively opened and a pivot connecting the two bodies. As the performance requirements of the electronic device increase, the thermal energy generated by the bodies and the heat dissipation requirements of the electronic device also gradually increase. However, when the two bodies of the modern bodies are relatively opened, the air outlet of the body may be blocked by the pivot, resulting in poor heat dissipation efficiency of the electronic device.

SUMMARY

The disclosure provides a pivot module and an electronic device with the good heat dissipation performance.

The pivot module of the disclosure includes a main shaft, a main connecting member, a sliding member, and a movable member. The main shaft includes a first linkage portion. The main connecting member is pivotally disposed at the main shaft and includes a groove. The sliding member is movably connected to the main shaft and the main connecting member, and includes a second linkage portion and a first driven portion. The second linkage portion is contacted with the first linkage portion of the main shaft. The movable member includes a second driven portion. The second driven portion is passed through the groove and contacted with the first driven portion. The main connecting member is used to rotate relative to the main shaft and the sliding member is driven to move on the main shaft, causing the movable member is driven to move relative to the main shaft by the sliding member.

The electronic device of the disclosure includes a first body, a second body, and a pivot module. The second body is pivotally connected to the first body through the pivot module. The pivot module includes a main shaft, a main connecting member, a sliding member, and a movable member. The main shaft includes a first linkage portion and is disposed at the first body. The main connecting member is disposed on the second body and is pivotally connected to the main shaft. The main connecting member includes a groove. The sliding member is movably connected to the main shaft and the main connecting member, and includes a second linkage portion and a first driven portion. The second linkage portion is contacted with the first linkage portion of the main shaft. The movable member includes a second driven portion. The second driven portion is passed through the groove and contacted with the first driven portion. The main connecting member is used to rotate relative to the main shaft and the sliding member is driven to move relative to the main shaft, causing the movable member is driven to move relative to the main shaft by the sliding member.

The pivot module of the disclosure includes a main shaft, a main connecting member, a sliding member, and a movable member. The main shaft includes a first linkage portion. The main connecting member is disposed on the main shaft. The main connecting member includes a groove. The sliding member is movably connected to the main shaft and the main connecting member, and includes a second linkage portion and a first driven portion. The second linkage portion is contacted with the first linkage portion of the main shaft. The movable member includes a second driven portion. The second driven portion is passed through the groove and contacted with the first driven portion. The main connecting member is used to rotate relative to the main shaft and the sliding member is driven to move by the main shaft, and the second driven portion of the movable member is driven by the first driven portion of the sliding member, so that the movable member is rotated relative to the main shaft.

Based on the above, the main connecting member of the electronic device and pivot module of the disclosure may rotate relative to the main shaft, causing the sliding member to slide relative to the main shaft while rotating relative to the main shaft. Thereby, the movable member (the media component) is driven by the sliding member to move relative to the main shaft, enhancing the convenience of use and the heat dissipation performance of the electronic device.

DESCRIPTION OF THE EMBODIMENTS

Figure 1:
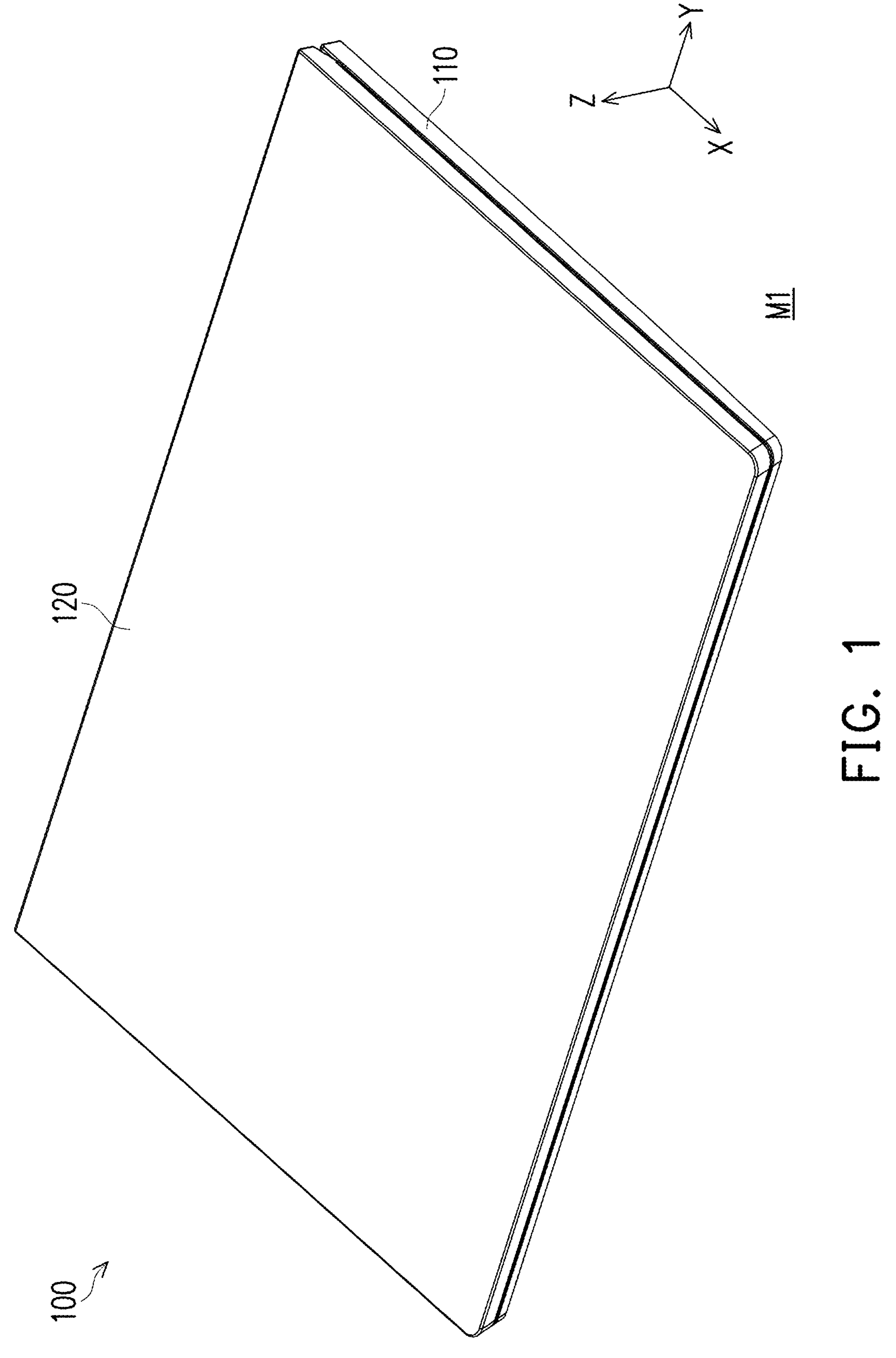
FIG. 1 is a schematic diagram of an electronic device according to an embodiment of the disclosure.
Figure 2:
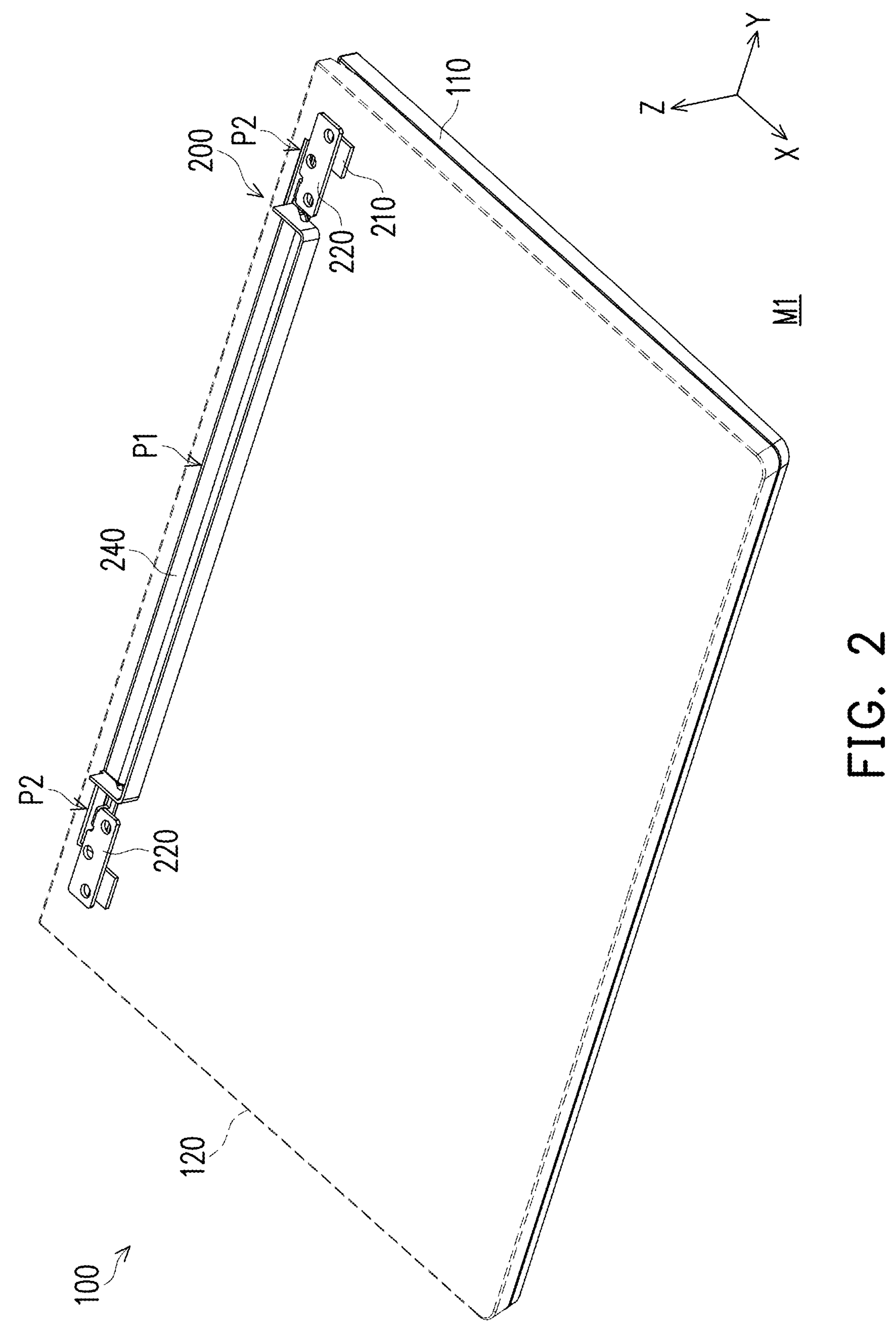
FIG. 2 is another schematic diagram of the electronic device of FIG. 1.
Figure 3:
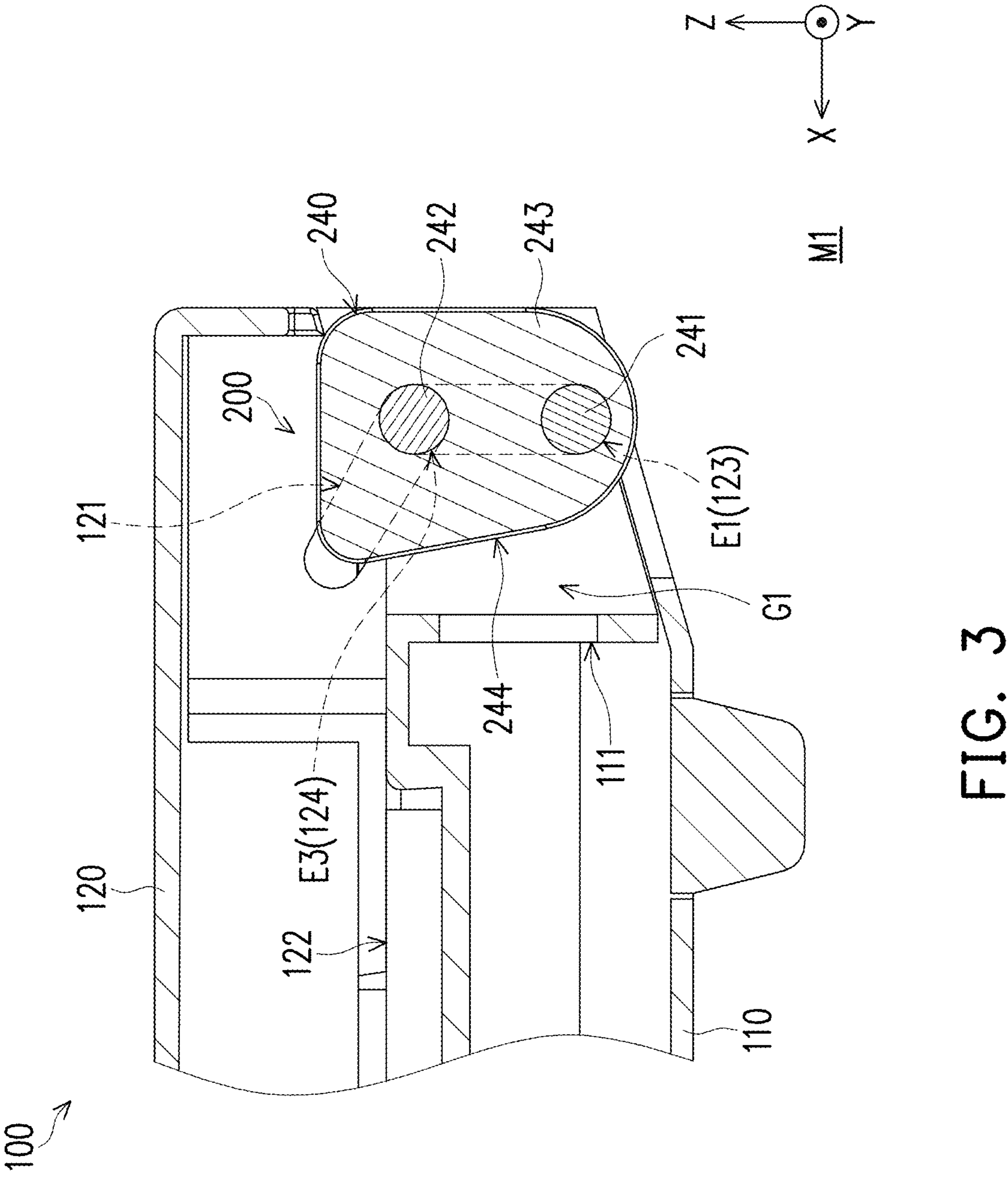
FIG. 3 is a cross-sectional view of the electronic device of FIG. 2.
Figure 4:
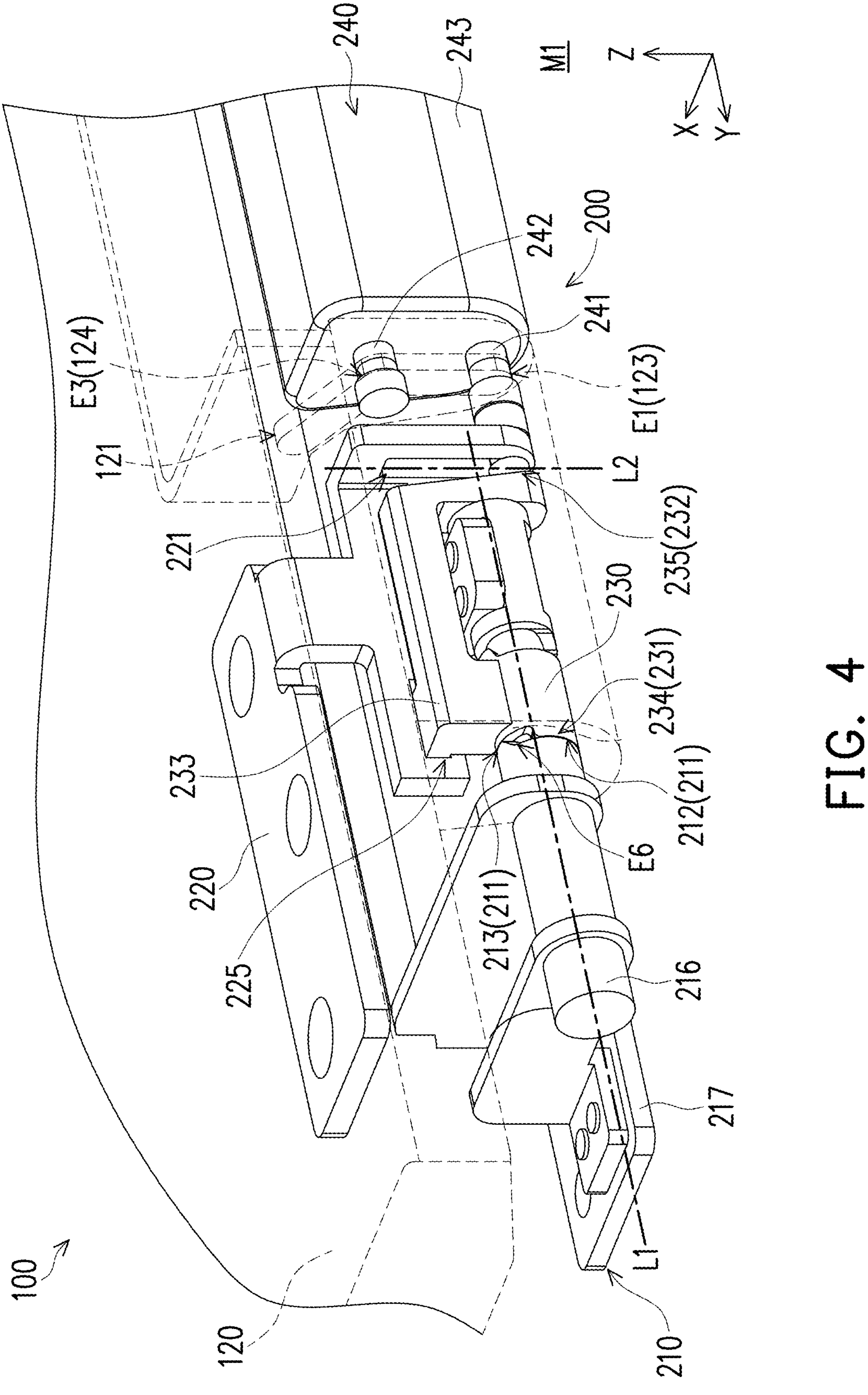
FIG. 4 is a schematic diagram of the pivot module of FIG. 2.
Figure 5:
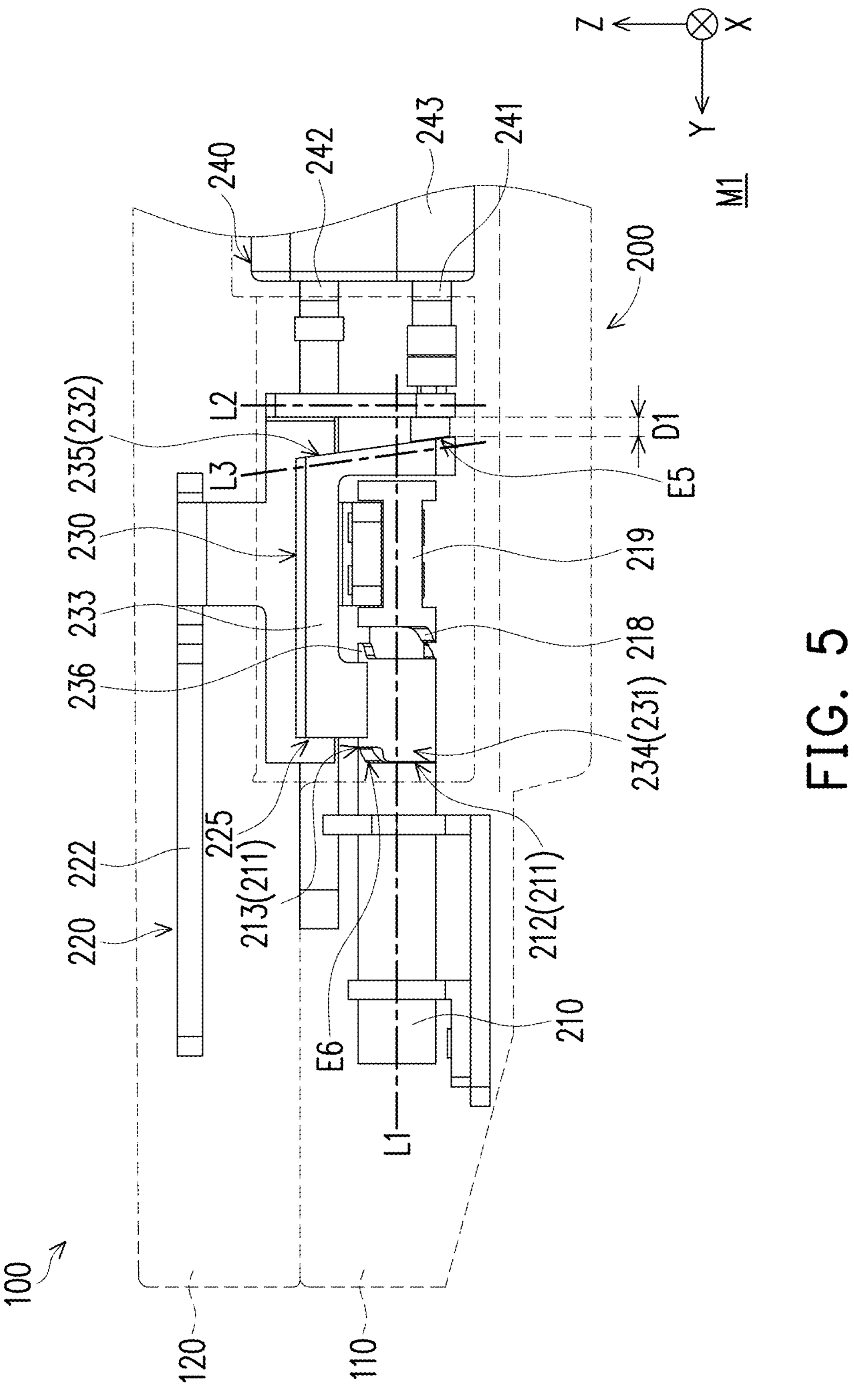
FIG. 5 is a rear view of the pivot module of FIG. 4.
Figure 6:
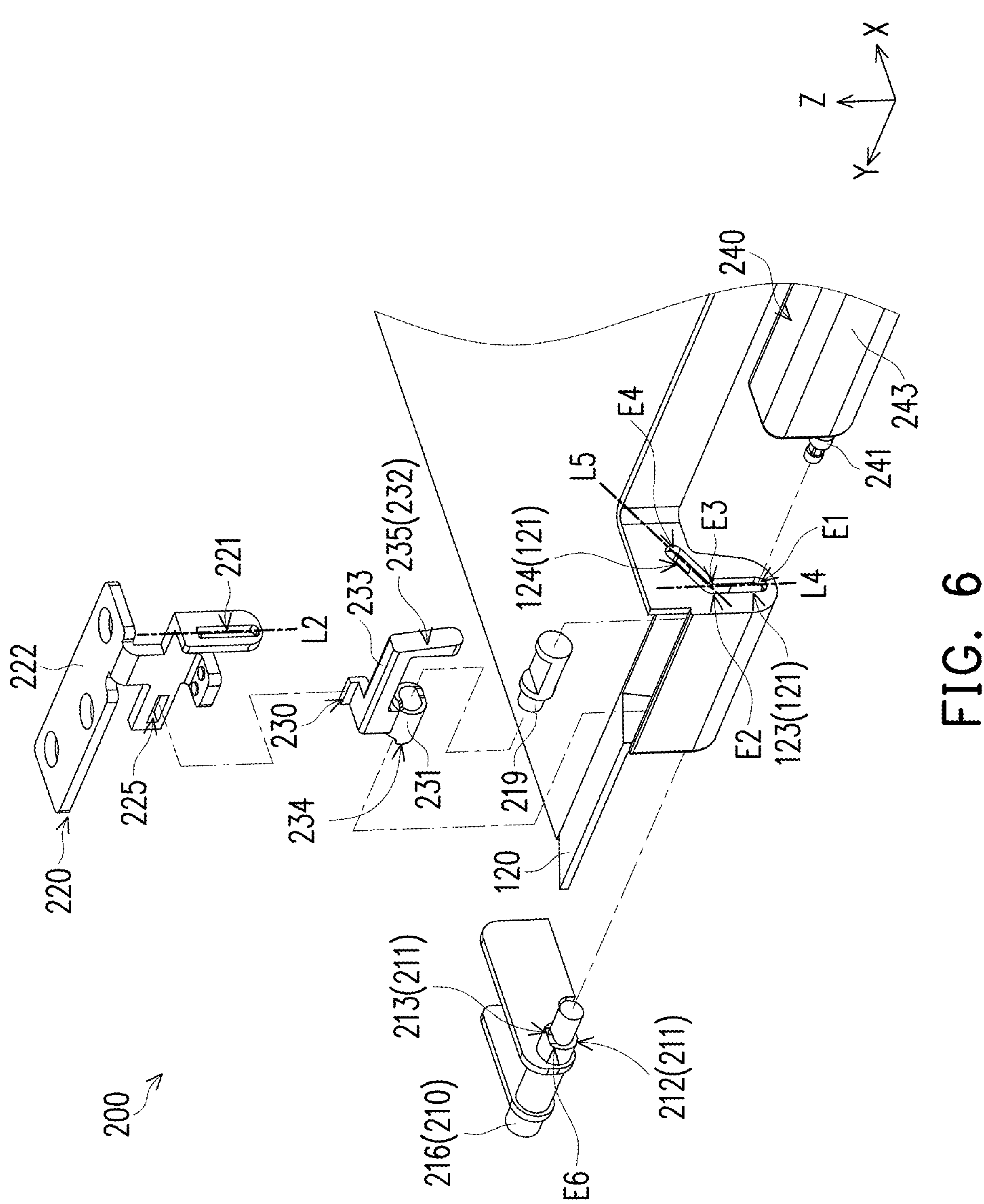
FIG. 6 is an exploded view of the pivot module of FIG. 4.

FIG. 1 is a schematic diagram of an electronic device according to an embodiment of the disclosure. FIG. 2 is another schematic diagram of the electronic device of FIG. 1. FIG. 3 is a cross-sectional view of the electronic device of FIG. 2. FIG. 4 is a schematic diagram of the pivot module of FIG. 2. FIG. 5 is a rear view of the pivot module of FIG. 4. FIG. 6 is an exploded view of the pivot module of FIG. 4. A Cartesian coordinate X-Y-Z is provided to facilitate the description of the components. Please refer to FIG. 1 to FIG. 6 at the same time, the electronic device 100 includes a first body 110, a second body 120, and a pivot module 200. The second body 120 is pivotally connected to the first body 110 through the pivot module 200. The electronic device 100 may be a laptop computer, but not limited thereto.

The pivot module 200 includes a main shaft 210, a main connecting member 220, a sliding member 230, and a movable member 240. The main shaft 210 includes a first linkage portion 211 and is disposed at the first body 110. The main connecting member 220 is disposed at the second body 120. The main connecting member 220 is pivotally disposed on the main shaft 210 along a rotation axis L1, and includes a groove 221. The main connecting member 220 may rotate with the rotation axis L1 as a center. The groove 221 has an extension axis L2. The sliding member 230 is movably connected to the main shaft 210 along the rotation axis L1, and is movably connected to the main connecting member 220. The sliding member 230 includes a second linkage portion 231 and a first driven portion 232. The second linkage portion 231 is directly contacted with the first linkage portion 211 of the main shaft 210. The movable member 240 includes a second driven portion 241. The second driven portion 241 is movably passed through the groove 221 and contacted with the first driven portion 232. The rotation axis L1 is parallel to the Y-axis. The rotation axis L1 is different from the extension axis L2 of the groove 221. In this embodiment, the rotation axis L1 is perpendicular to the extension axis L2.

Figure 7:
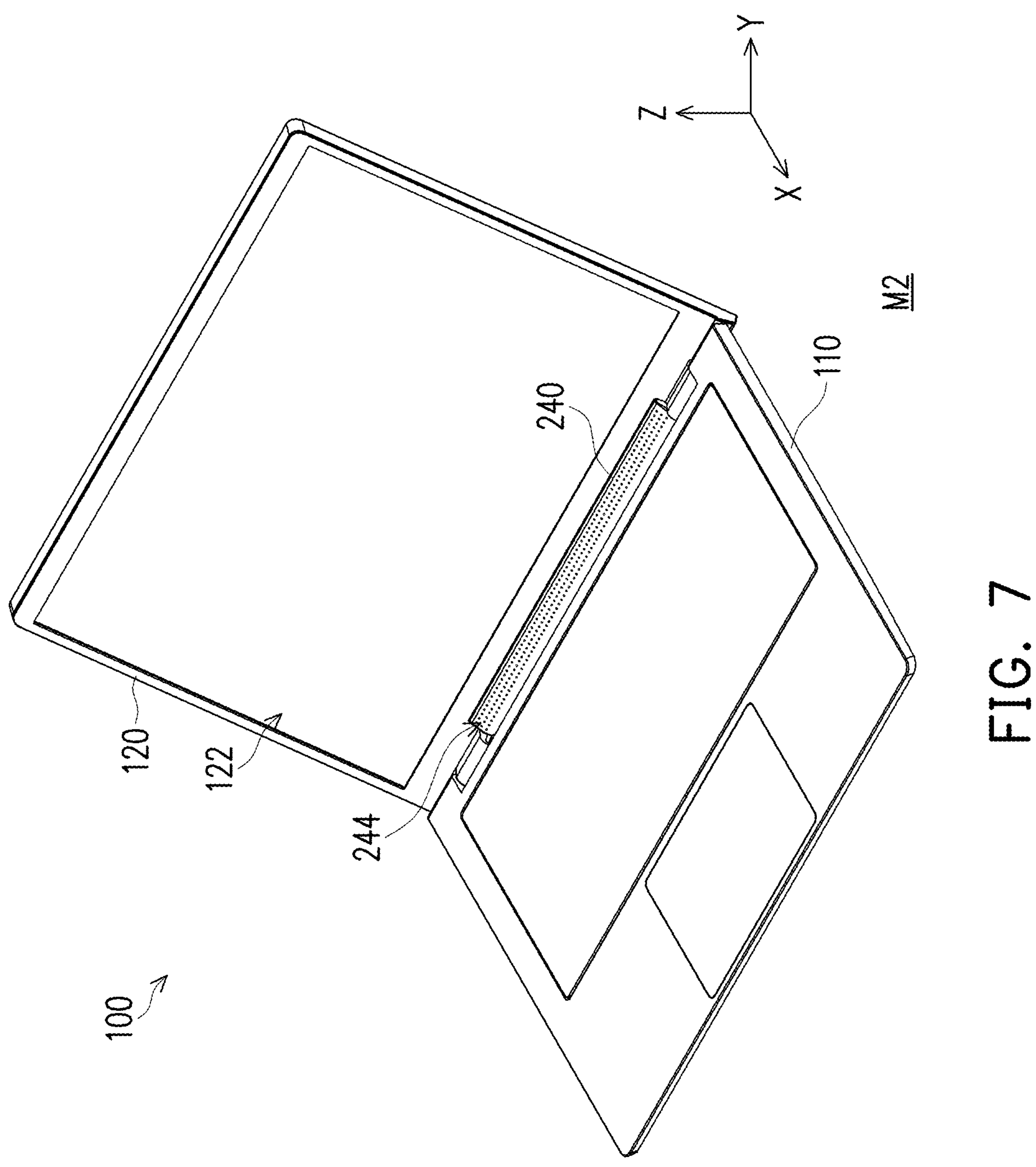
FIG. 7 is a schematic diagram of the electronic device of FIG. 1 in the second state.

The second body 120 may rotate relative to the first body 110, causing the electronic device 100 to switch between a first state M1 (shown in FIG. 1) and a second state M2 (shown in FIG. 7). During the rotation of the second body 120, the main connecting member 220 (the second body 120) rotates relative to the main shaft 210 (the first body 110), thereby the sliding member 230 is driven to move along the rotation axis L1 on the main shaft 210, causing the movable member 240 is driven to move relative to the main shaft 210 by the sliding member 230. The first body 110 includes a heat dissipation hole 111, and the movable member 240 may automatically move relative to the heat dissipation hole 111 by the rotation of the second body 120, thereby changing a gap between the heat dissipation hole 111 (the first body 110) and the movable member 240, to create more space for the first body 110 to dissipate the heat, thus improving the convenience of use and the heat dissipation performance of the electronic device 100.

As shown in FIG. 4 to FIG. 6, the main shaft 210 includes a shaft 216, a plate 217, and a connecting shaft 219. The plate 217 is connected to the shaft 216 and the first body 110. The shaft 216 may rotate relative to the plate 217. The connecting shaft 219 is connected to the shaft 216 along the rotation axis L1, rotating together with the shaft 216. For example, the connecting shaft 219 may be sleeved on the shaft 216 and fixed with a fastener (not shown). The main connecting member 220 includes a connecting body 222. The connecting body 222 is connected to the second body 120 and the main shaft 210. The groove 221 of the main connecting member 220 is located on the connecting body 222. The connecting body 222 is provided with a connecting slot 225. The sliding member 230 is movably connected to the connecting body 222 through the connecting slot 225. An extension direction of the connecting slot 225 is parallel to the rotation axis L1, to limit the moving direction of the sliding member 230 relative to the main connecting member 220.

The second linkage portion 231 of the sliding member 230 is sleeved on the shaft 216 and the connecting shaft 219. The main shaft 210 includes a limiting portion 218. The limiting portion 218 is disposed at the connecting shaft 219. The second linkage portion 231 includes a limiting protrusion 236. Furthermore, in the Y-axis direction, the second linkage portion 231 of the sliding member 230 is disposed between the first linkage portion 211 and the limiting portion 218 of the main shaft 210. When the sliding member 230 moves relative to the main connecting member 220, the limiting protrusion 236 may abut against the limiting portion 218 to limit the rotation of the main connecting member 220, thereby limiting the rotation angle of the second body 120 relative to the first body 110.

As shown in FIG. 5 and FIG. 6, one of the first linkage portion 211 and the second linkage portion 231 includes a bottom surface and a top surface, the top surface is protrudes away from the bottom surface, and the other of the first linkage portion 211 and the second linkage portion 231 includes a protrusion. In this embodiment, the first linkage portion 211 includes the bottom surface 212 and the top surface 213, and the second linkage portion 231 includes the protrusion 234, but not limited thereto. There is a distance between the bottom surface 212 and the top surface 213, and one end E6 of the bottom surface 212 may be connected to the top surface 213 by an inclined surface. The main connecting member 220 may rotate relative to the main shaft 210, causing the second linkage portion 231 (the sliding member 230) to be driven to rotate, so that the protrusion 234 abuts against the bottom surface 212 or the top surface 213 to drive the sliding member 230 to move relative to the main shaft 210 along the rotation axis L1.

The sliding member 230 further includes a sliding body 233. The second linkage portion 231 and the first driven portion 232 are formed at opposite ends of the sliding body 233. The sliding body 233 is slidably connected to the connecting body 222 of the main connecting member 220. The first driven portion 232 includes an inclined surface 235, and an extension axis L3 of the inclined surface 235 is different from the rotation axis L1 and the extension axis L2 of the groove 221. The second body 120 of the electronic device 100 includes a groove 121. The second driven portion 241 of the movable member 240 is passed through the groove 121 and the groove 221 of the main connecting member 220, and abuts against the inclined surface 235 of the first driven portion 232. When the sliding member 230 moves relative to the main shaft 210, the first driven portion 232 (the inclined surface 235) pushes against the second driven portion 241. The second driven portion 241 of the movable member 240 is driven by the first driven portion 232 of the sliding member 230, so that the second driven portion 241 moves relative to the main shaft 210 along the extension axis L2, and the movable member 240 is rotated relative to the main shaft 210.

As shown in FIG. 4 to FIG. 6, the groove 121 of the second body 120 includes a first portion 123 and a second portion 124 connected to each other. The first portion 123 includes a first end E1 and a second end E2 opposite to each other. The second portion 124 includes a third end E3 and a fourth end E4 opposite to each other. The second end E2 is connected to the third end E3. A first extension axis L4 of the first portion 123 is parallel to the extension axis L2 of the groove 221 of the main connecting member 220, and a second extension axis L5 of the second portion 124 is different from the extension axis L2 and the rotation axis L1. The groove 121 is V-shaped.

The movable member 240 further includes a moving body 243 and a third driven portion 242. The second driven portion 241 and the third driven portion 242 are connected to the moving body 243. The second driven portion 241 is movably passed through the first portion 123 of the groove 121, and the third driven portion 242 is movably passed through the second portion 124 of the groove 121. When the second driven portion 241 is pushed by the sliding member 230 to move between the first end E1 and the second end E2 of the first portion 123, the third driven portion 242 is driven to move between the third end E3 and the fourth end E4 of the second portion 124. Since the extension directions of the first extension axis L4 and the second extension axis L5 are different from each other, when the second driven portion 241 and the third driven portion 242 move within the first portion 123 and the second portion 124 respectively, the movable member 240 may rotate relative to the main shaft 210 (the heat dissipation hole 111). The movable member 240 is a media component, for example, a speaker, but not limited thereto.

In addition, as shown in FIG. 2, the pivot module 200 includes a common portion P1 and a connection portion P2. The movable member 240 belongs to the common portion P1. The main shaft 210, the main connecting member 220, and the sliding member 230 belong to the connection portion P2. The electronic device 100 of the embodiment includes two connection portions P2 and one common portion P1. The common portion P1 located between the two connection portions P2, so that the common portion P1 (movable member 240) may be stably rotated relative to the first body 110, but not limited thereto.

FIG. 1 to FIG. 5 show the electronic device 100 in the first state M1. As shown in FIG. 1 to FIG. 5, in the first state M1, the second body 120 is closed onto the first body 110, and a display surface 122 of the second body 120 faces toward the first body 110. The electronic device 100 is closed. The second linkage portion 231 (the protrusion 234) of the sliding member 230 abuts against the bottom surface 212 of the first linkage portion 211 of the main shaft 210, thereby keeping the sliding member 230 away from the groove 221. The second driven portion 241 of the movable member 240 is located at the first end E1 of the first portion 123 of the groove 121, and passes through the groove 221 of the main connecting member 220 to abut against an extremity E5 of the first driven portion 232 of the sliding member 230. There is a distance D1 between the extremity E5 and the groove 221. The third driven portion 242 is located at the third end E3 of the second portion 124. There is a gap G1 between the movable member 240 and the heat dissipation hole 111 (the first body 110). A working surface 244 of the movable member 240 faces towards the heat dissipation hole 111 of the first body 110. The working surface 244 may, for example, include a plurality of sound holes, the speaker (the movable member 240) outputs sound through the sound holes.

Figure 8:
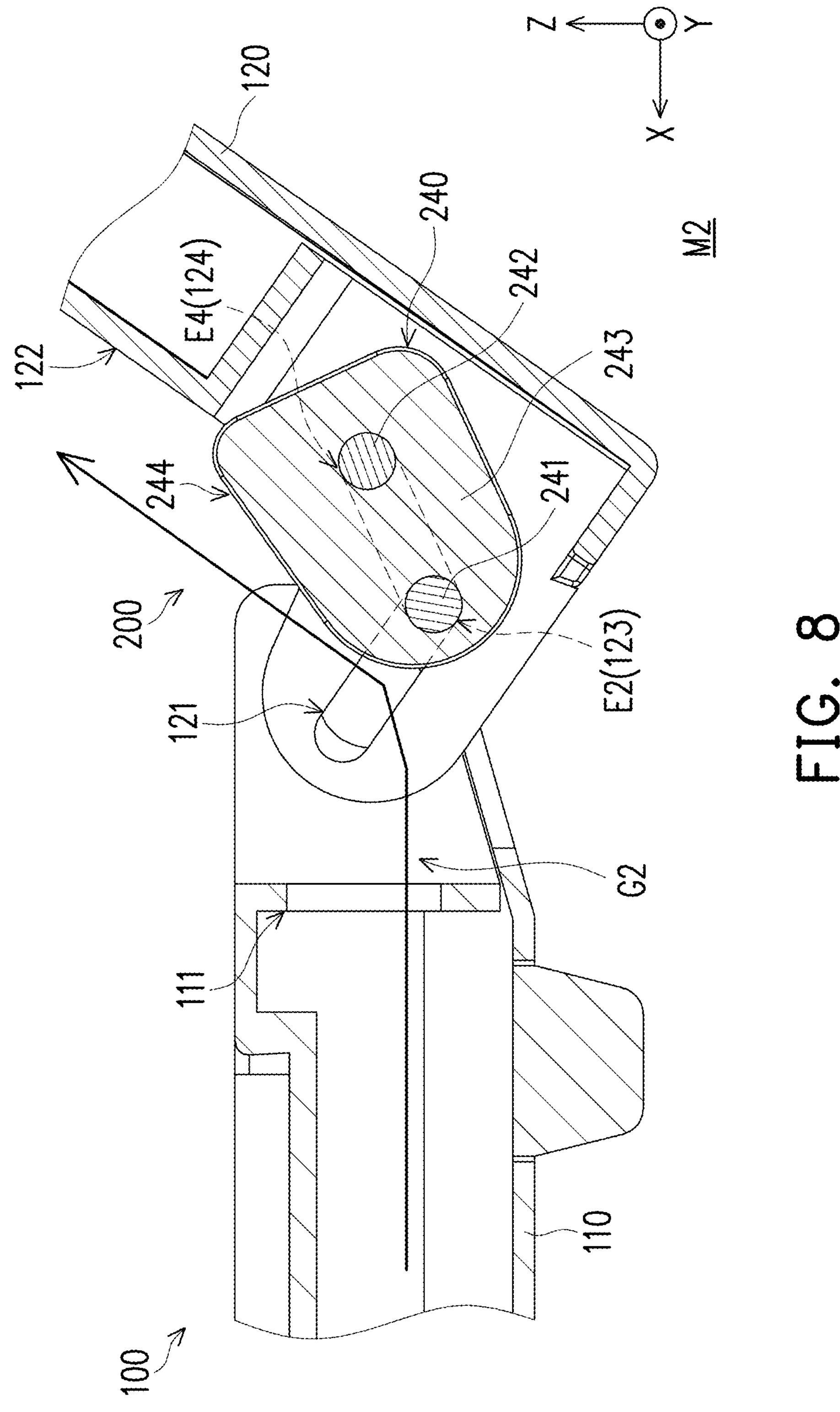
FIG. 8 is a cross-sectional view of the electronic device of FIG. 7.
Figure 9:
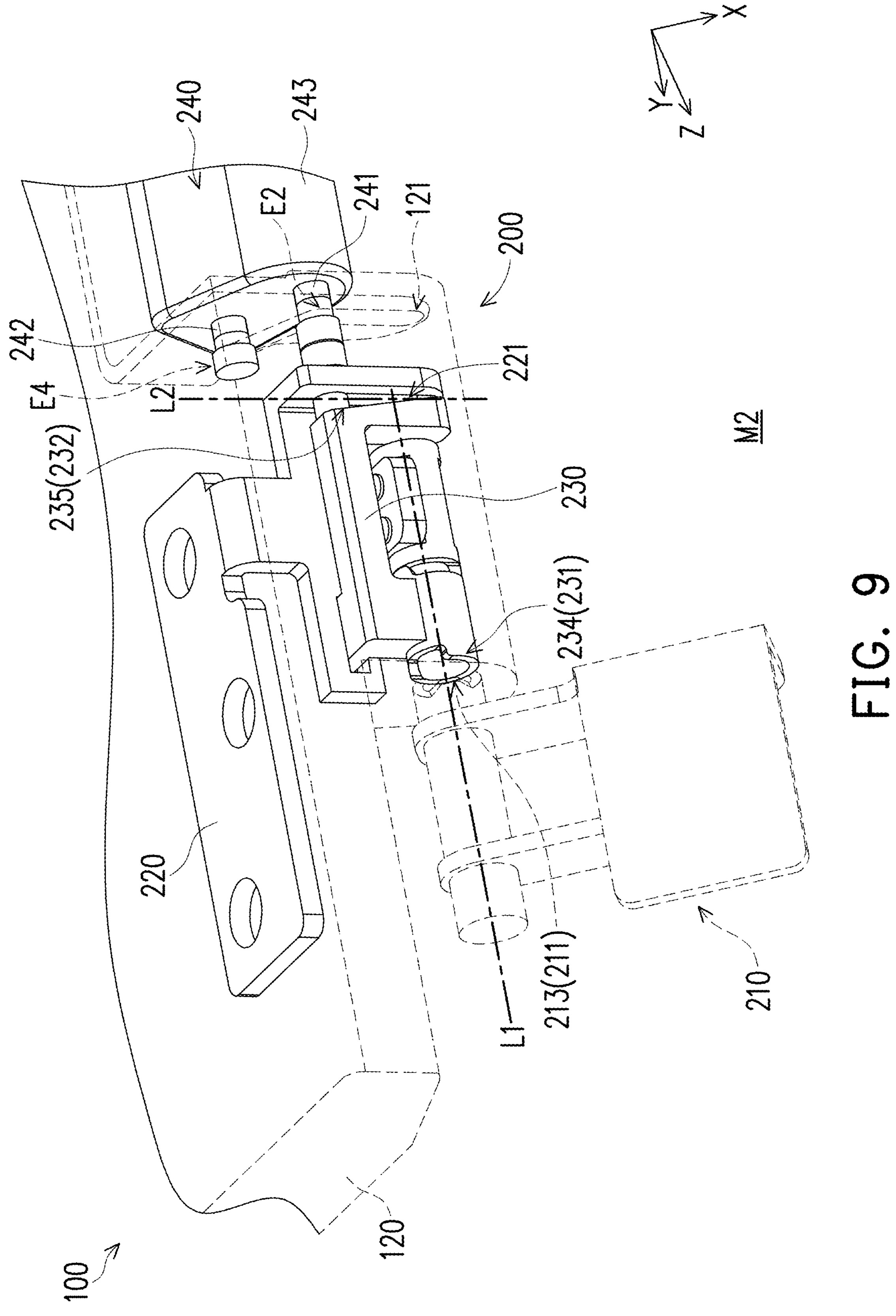
FIG. 9 is a schematic diagram of the pivot module of FIG. 7.
Figure 10:
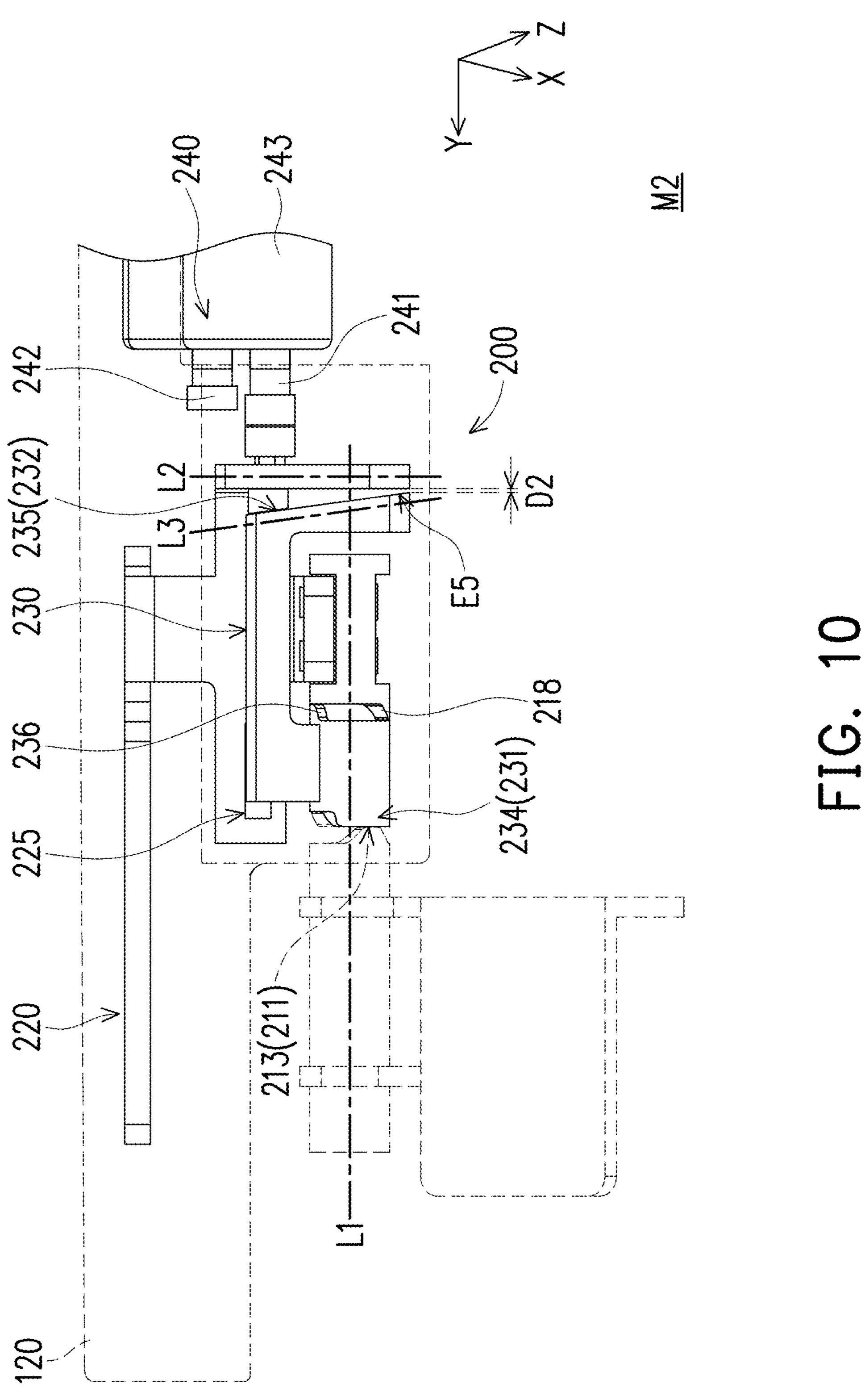
FIG. 10 is a rear view of the pivot module of FIG. 9.

FIG. 7 is a schematic diagram of the electronic device of FIG. 1 in the second state. FIG. 8 is a cross-sectional view of the electronic device of FIG. 7. FIG. 9 is a schematic diagram of the pivot module of FIG. 7. FIG. 10 is a rear view of the pivot module of FIG. 9. Please refer to FIG. 7 to FIG. 10 at the same time. In the process of switching the electronic device 100 from the first state M1 to the second state M2, the second body 120 (the main connecting member 220) is forced to rotate relative to the first body 110 (the main shaft 210), thereby driving the sliding member 230 to rotate relative to the main shaft 210. During the rotation process of the sliding member 230, the second linkage portion 231 (the protrusion 234) of the sliding member 230 slides on the bottom surface 212 of the first linkage portion 211 of the main shaft 210. At this time, the extremity E5 of the first driven portion 232 maintains the distance D1 (shown in FIG. 5) from the groove 221 of the movable member 240.

As the sliding member 230 continues to rotate, the second linkage portion 231 (the protrusion 234) then moves from the bottom surface 212 to the top surface 213 of the first linkage portion 211. At this time, the sliding member 230 is pushed by the top surface 213 and moves relative to the main connecting member 220 along the rotation axis L1, causing the extremity E5 to have another distance D2 from the groove 221. The distance D2 is smaller than the distance D1 (shown in FIG. 5). Thereby, while the sliding member 230 rotates relative to the main shaft 210 with the rotation axis L1 as the center, the sliding member 230 also moves along the rotation axis L1 relative to the main shaft 210 and the main connecting member 220 to approach the movable member 240.

It can be seen that only when the sliding member 230 rotates to a specific angle (i.e., when the second linkage portion 231 abuts the end E6 of the bottom surface 212 and the top surface 213), the sliding member 230 is driven by the first linkage portion 211 to rotate relative to the main shaft 210 through the bottom surface 212 and the top surface 213 of the first linkage portion 211.

The sliding of the sliding member 230 along the rotation axis L1 causes the first driven portion 232 (the inclined surface 235) to push the second driven portion 241 of the movable member 240. The second driven portion 241, limited by the groove 221 of the main connecting member 220 and the groove 121 of the second body 120, slides along the extension axis L2 from the first end E1 towards the second end E2 of the first portion 123 of the groove 121. When the second driven portion 241 slides within the first portion 123, the third driven portion 242 is pushed to slide from the third end E3 towards the fourth end E4 of the second portion 124 of the groove 121, thereby causing the movable member 240 to flip relative to the first body 110.

As shown in FIG. 7 to FIG. 10, when the electronic device 100 is in the second state M2, the second body 120 is opened relative to the first body 110, and the display surface 122 of the second body 120 faces outward for display. The electronic device 100 is turned on. The second linkage portion 231 (the protrusion 234) of the sliding member 230 abuts the top surface 213 of the first linkage portion 211 of the main shaft 210, causing the sliding member 230 to be positioned as shown in FIG. 9. The second driven portion 241 of the movable member 240 is located at the second end E2 of the first portion 123 of the groove 121, and the third driven portion 242 is located at the fourth end E4 of the second portion 124, causing the movable member 240 to flip relative to the main shaft 210 to the position shown in FIG. 8. The working surface 244 of the movable member 240 (the speaker) faces outward to emit sound. There is a gap G2 between the movable member 240 and the heat dissipation hole 111 of the first body 110, the gap G2 is larger than the gap G1 between the movable member 240 and the first body 110 in the first state M1 (shown in FIG. 3). The heat within the first body 110 exits the first body 110 through the heat dissipation hole 111.

It may be seen that the movable member 240 of the electronic device 100 may be actuated to different positions according to the rotation of the second body 120 relative to the first body 110 (in the first state M1 or in the second state M2). When the electronic device 100 is in the second state M2, the movable member 240 moves away from the heat dissipation hole 111, thereby widening the heat dissipation channel of the electronic device 100 to improve the heat dissipation efficiency of the electronic device 100. Through the rotation of the movable member 240, the working surface 244 of the movable member 240 in the second state M2 moves away from the heat dissipation hole 111, the movable member 240 emits sound outwardly, thereby improving the sound quality of the movable member 240.

In the process of switching the electronic device 100 from the second state M2 to the first state M1, the main connecting member 220 (the second body 120) drives the sliding member 230 to rotate relative to the main shaft 210 (the first body 110), causing the protrusion 234 of the second linkage portion 231 to move from the top surface 213 to the bottom surface 212 of the first linkage portion 211. Thereby, the sliding member 230 (the first driven portion 232) moves away from the movable member 240, and the second driven portion 241 slides relative to the sliding member 230. The second driven portion 241 moves from the second end E2 to the first end E1 of the first portion 123 of the groove 121, driving the third driven portion 242 to move from the fourth end E4 to the third end E3 of the second portion 124 of the groove 121, and the moving body 243 flips from the position shown in FIG. 9 to the position shown in FIG. 5 along with the movement of the second driven portion 241 and the third driven portion 242. The electronic device 100 switches to the first state M1.

Figure 11:
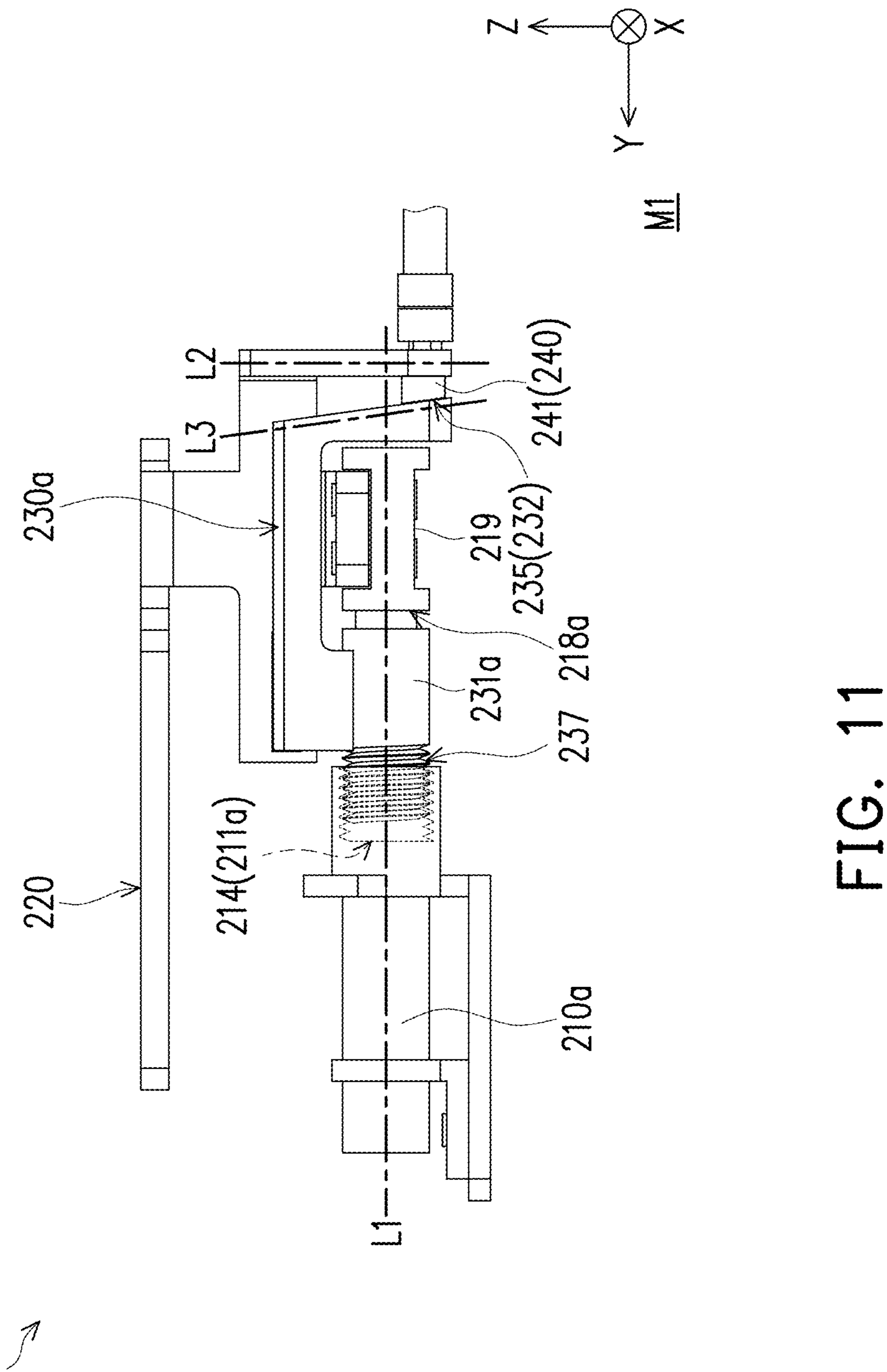
FIG. 11 is a schematic diagram of a pivot module in the first state according to another embodiment of the disclosure.
Figure 12:
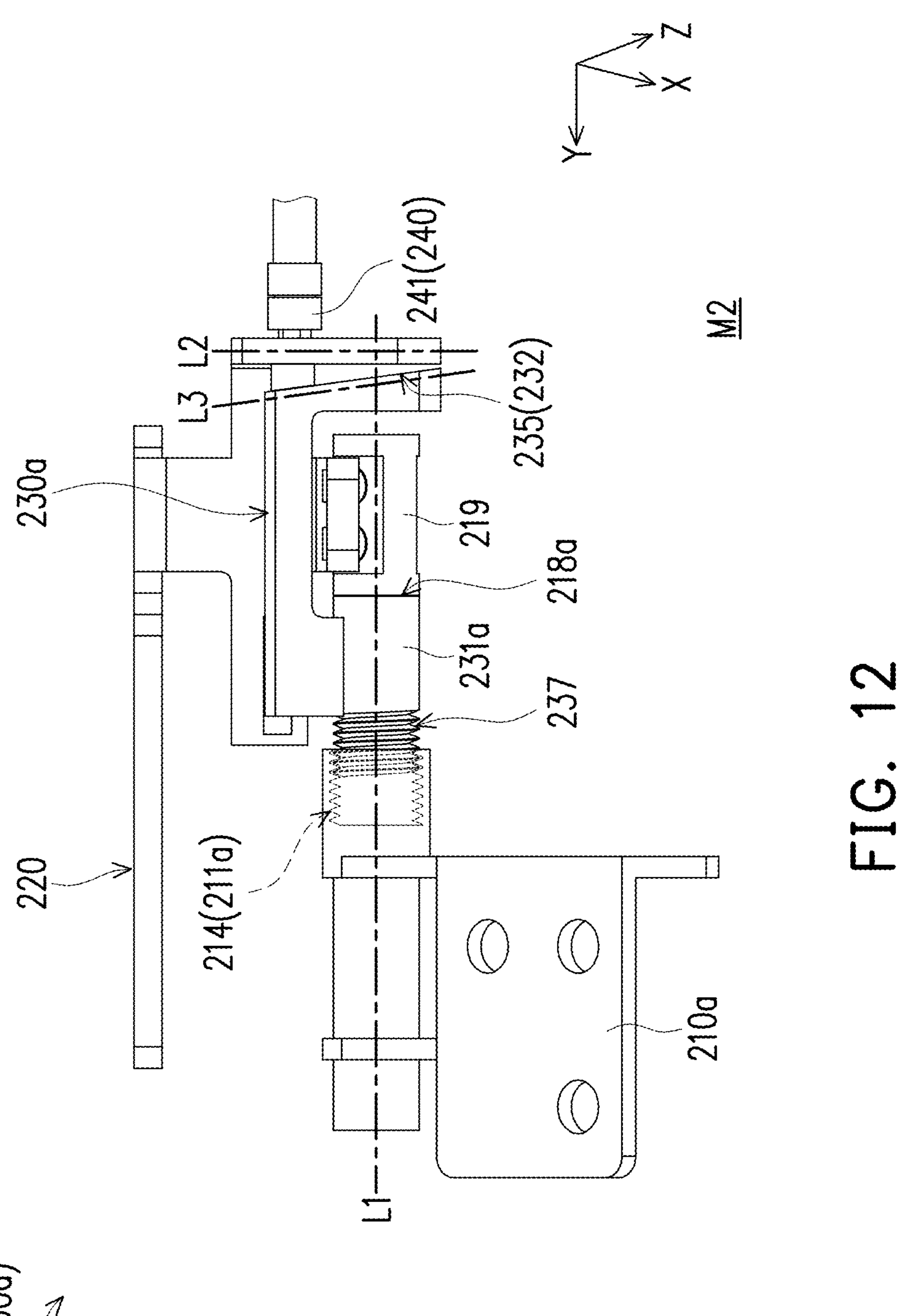
FIG. 12 is a schematic diagram of the pivot module of FIG. 11 in the second state.

FIG. 11 is a schematic diagram of a pivot module in the first state according to another embodiment of the disclosure. FIG. 12 is a schematic diagram of the pivot module of FIG. 11 in the second state. Please refer to FIG. 4, FIG. 11, and FIG. 12 at the same time, the pivot module 200*a* (the electronic device 100*a*) of this embodiment is similar to the previous embodiment. The difference between the two is that one of the first linkage portion 211*a* of the main shaft 210*a* and the second linkage portion 231*a* of the sliding member 230*a* of the embodiment includes an external thread, and the other of the first linkage portion 211*a* and the second linkage portion 231*a* includes an internal thread. The external thread is engaged with the internal thread.

In this embodiment, the first linkage portion 211*a* includes the internal thread 214, and the second linkage portion 231*a* includes the external thread 237, but not limited thereto. During the process of switching the electronic device 100*a* between the first state M1 and the second state M2, the sliding member 230*a* rotates with the main connecting member 220, and the second linkage portion 231*a* continuously moves relative to the main shaft 210*a* along the rotation axis L1 through the external thread 237, to drive the movable member 240 to rotate relative to the main shaft 210*a*. As shown in FIG. 12, the sliding member 230*a* continuously moves relative to the main shaft 210*a* until the second linkage portion 231*a* is contacted with the limiting portion 218*a* of the main shaft 210*a*. Here, the limiting portion 218*a* is, for example, a flat surface. The limiting portion 218*a* stops the movement of the sliding member 230*a* to limit the rotation angle of the sliding member 230*a* (the main connecting member 220) relative to the main shaft 210*a*.

Compared to the pivot module 200 of the embodiment in FIG. 5, the pivot module 200 only drives the second linkage portion 231 to move by the first linkage portion 211 when rotated to a specific angle, thereby flipping the movable member 240. In this embodiment, the second linkage portion 231*a* (the sliding member 230*a*) continuously rotate relative to the first body 110 during the rotation process through the internal thread 214 and the external thread 237, causing the movable member 240 to continuously rotate relative to the first body 110 along with the sliding member 230*a*. The pivot module 200*a* (the electronic device 100*a*) of this embodiment has the same effect as the previous embodiment, and is not repeated herein.

Figure 13:
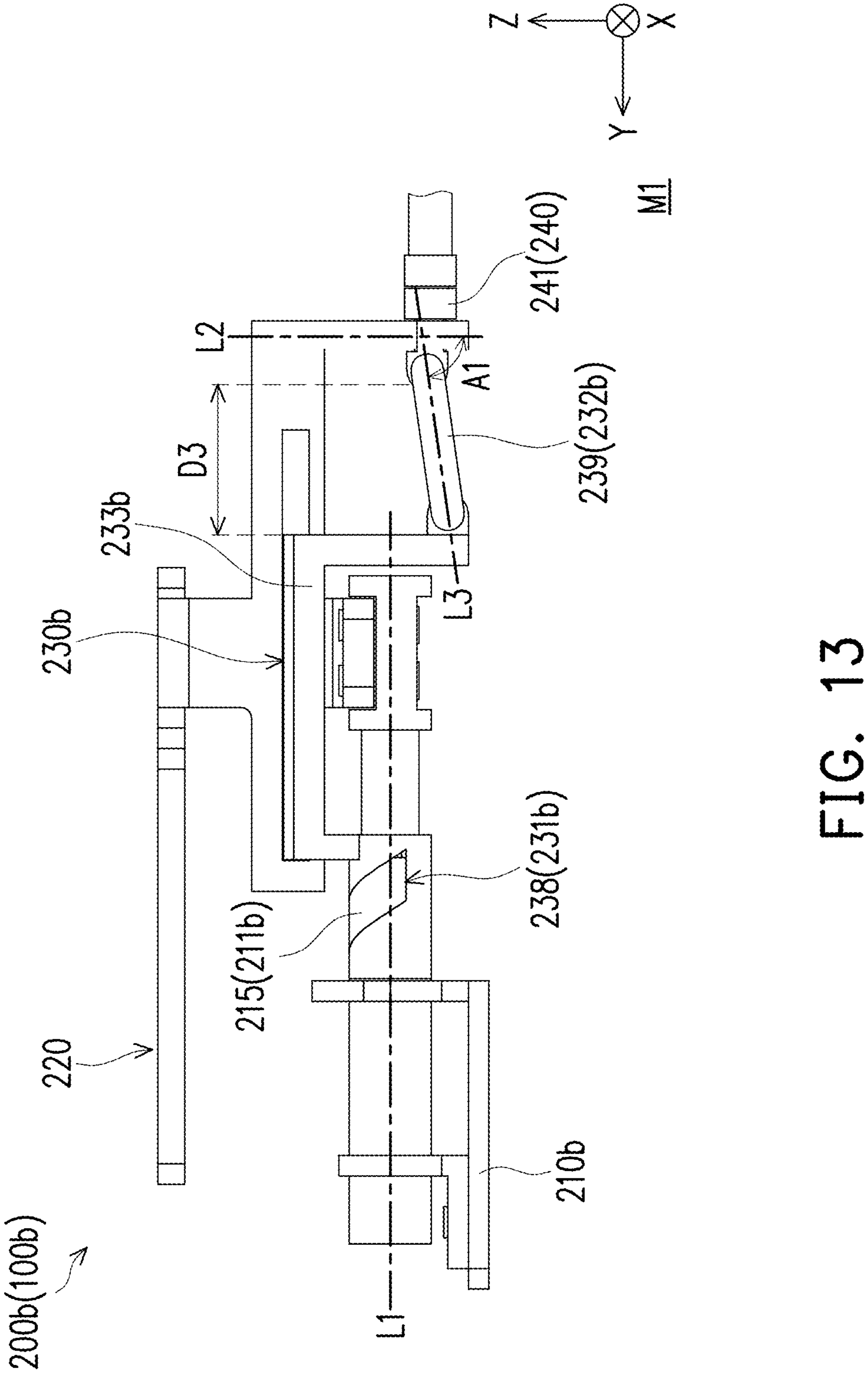
FIG. 13 is a schematic diagram of a pivot module in the first state according to another embodiment of the disclosure.
Figure 14:
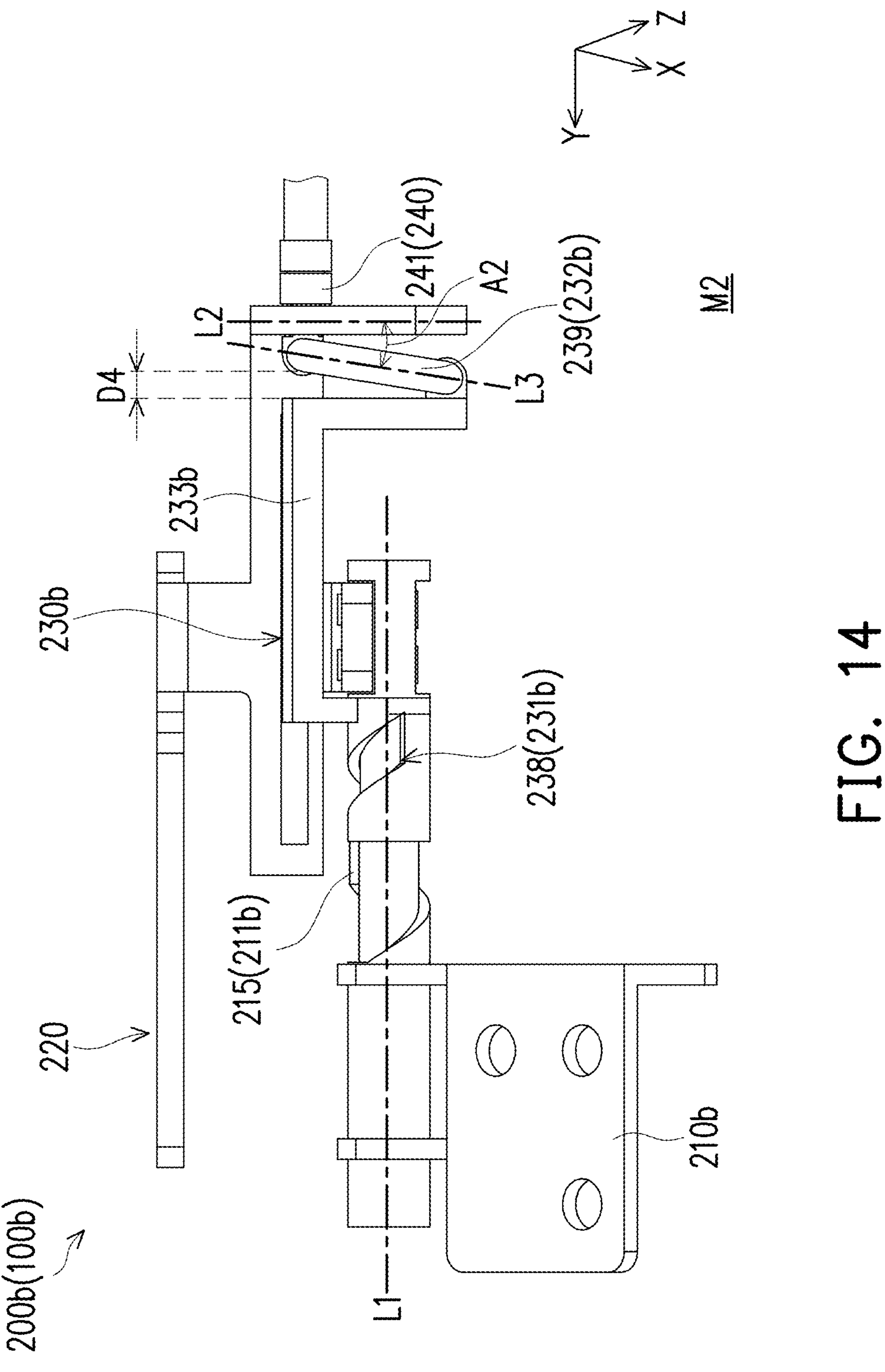
FIG. 14 is a schematic diagram of the pivot module of FIG. 13 in the second state.

FIG. 13 is a schematic diagram of a pivot module in the first state according to another embodiment of the disclosure. FIG. 14 is a schematic diagram of the pivot module of FIG. 13 in the second state. Please refer to FIG. 4, FIG. 13, and FIG. 14 at the same time, the pivot module 200*b* (the electronic device 100*b*) of this embodiment is similar to the previous embodiment. The difference between the two is that one of the first linkage portion 211*b* and the second linkage portion 231*b* of the embodiment includes a spiral protrusion, and the other of the first linkage portion 211*b* and the second linkage portion 231*b* includes a spiral groove. The first driven portion 232*b* is a rod 239.

In this embodiment, the first linkage portion 211*b* includes the spiral protrusion 215, and the second linkage portion 231*b* includes the spiral groove 238, but not limited thereto. The spiral protrusion 215 and the spiral groove 238 surround the rotation axis L1, and the spiral groove 238 is at least partially sleeved in the spiral protrusion 215. The rod 239 is pivotally connected to the sliding body 233*b* and the second driven portion 241 of the movable member 240.

During the process of switching the electronic device 100*b* between the first state M1 and the second state M2, the sliding member 230*b* rotates with the main connecting member 220, and the second linkage portion 231*b* continuously moves relative to the main shaft 210*b* along the rotation axis L1 through the spiral groove 238, thereby pushing the rod 239 (the first driven portion 232*b*). Here, the extension axis L3 of the rod 239 (the first driven portion 232*b*) is different from the rotation axis L1 and the extension axis L2. There is an angle between the extension axis L3 and the extension axis L2. The angle is greater than 0 degrees. Thereby, when the rod 239 (the first driven portion 232*b*) receives an external force (i.e., being pushed) in the direction of the rotation axis L1, the rod 239 generates a component force in the direction of the extension axis L2, causing the rod 239 to drive the second driven portion 241 to move along the extension axis L2, and to drive the movable member 240 to rotate relative to the main shaft 210*b*.

As shown in FIG. 13, in the first state M1, there is the distance D3 between the sliding member 230*b* and the second driven portion 241. There is the angle A1 between the extension axis L3 and the extension axis L2. The spiral protrusion 215 (the first linkage portion 211*b*) is completely located within the spiral groove 238 (the second linkage portion 231*b*). As shown in FIG. 14, in the second state M2, there is the distance D4 between the sliding member 230*b* and the second driven portion 241. There is the angle A2 between the extension axis L3 and the extension axis L2.

The spiral protrusion 215 (the first linkage portion 211*b*) is partially located within the spiral groove 238 (the second linkage portion 231*b*). The distance D3 is greater than the distance D4, and the angle A1 is greater than the angle A2. The pivot module 200*b* (the electronic device 100*b*) of this embodiment has the same effect as the previous embodiment, and is not repeated herein.

Figure 15:
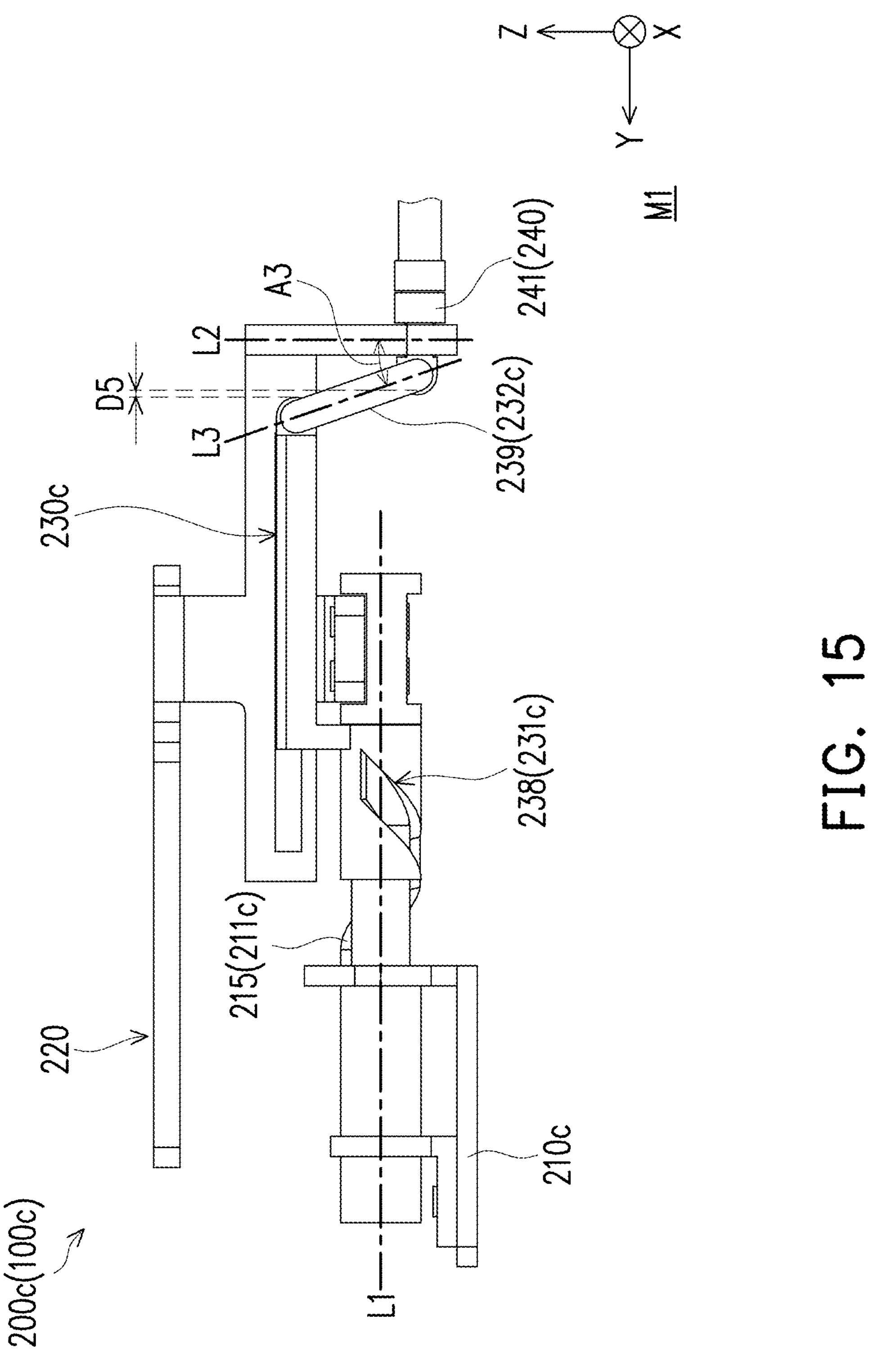
FIG. 15 is a schematic diagram of a pivot module in the first state according to another embodiment of the disclosure.
Figure 16:
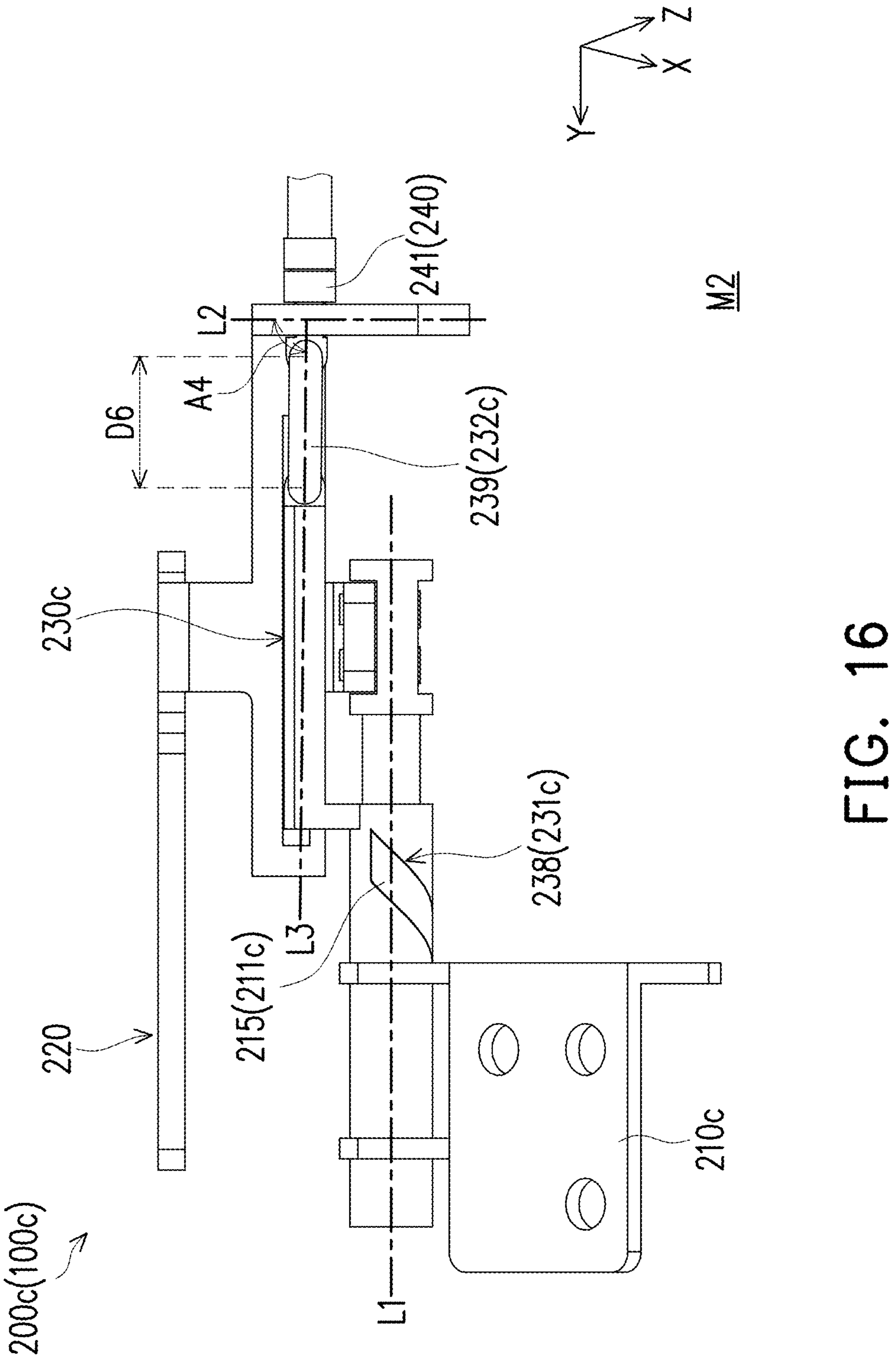
FIG. 16 is a schematic diagram of the pivot module of FIG. 15 in the second state.

FIG. 15 is a schematic diagram of a pivot module in the first state according to another embodiment of the disclosure. FIG. 16 is a schematic diagram of the pivot module of FIG. 15 in the second state. Please refer to FIG. 13, FIG. 15, and FIG. 16 at the same time, the pivot module 200*b* (the electronic device 100*b*) of this embodiment is similar to the previous embodiment. The difference between the two is that there is the distance D5 between the sliding member 230*c* and the second driven portion 241 of this embodiment in the first state M1. There is the angle A3 between the extension axis L3 of the rod 239 (the first driven portion 232*c*) and the extension axis L2. The spiral protrusion 215 (the first linkage portion 211*c*) of the main shaft 210*c* is partially located within the spiral groove 238 (the second linkage portion 231*c*). In the second state M2, there is the distance D6 between the sliding member 230*c* and the second driven portion 241. There is the angle A4 between the extension axis L3 and the extension axis L2. The spiral protrusion 215 (the first linkage portion 211*c*) is completely located within the spiral groove 238 (the second linkage portion 231*c*). The distance D6 is greater than the distance D5, and the angle A4 is greater than the angle A3. The pivot module 200*c* (the electronic device 100*c*) of this embodiment has the same effect as the previous embodiment, and is not repeated herein.

In summary, the main connecting member of the electronic device and pivot module of the disclosure may rotate relative to the main shaft, causing the sliding member to slide relative to the main shaft while rotating relative to the main shaft. Thereby, the movable member (the media component) is driven by the sliding member to move relative to the main shaft, enhancing the convenience of use and the heat dissipation performance of the electronic device.

What is claimed is:

1. A pivot module, comprising:

a main shaft, comprising a first linkage portion;

a main connecting member, pivotally disposed at the main shaft, the main connecting member comprises a groove;

a sliding member, movably connected to the main shaft and the main connecting member, the sliding member comprises a second linkage portion and a first driven portion, the second linkage portion is contacted with the first linkage portion of the main shaft; and a movable member, comprising a second driven portion, the second driven portion is passed through the groove and contacted with the first driven portion, wherein the main connecting member is used to rotate relative to the main shaft and the sliding member is driven to move on the main shaft, causing the movable member is driven to move relative to the main shaft by the sliding member.

2. The pivot module according to claim 1, wherein the main connecting member is used to rotate with a rotation axis as a center, the groove has an extension axis, and the rotation axis is different from the extension axis.

3. The pivot module according to claim 1, wherein one of the first linkage portion and the second linkage portion comprises a bottom surface and a top surface, the other one of the first linkage portion and the second linkage portion comprises a protrusion, the main connecting member is used to rotate relative to the main shaft to cause the protrusion to abut against the bottom surface or the top surface, thereby causing the sliding member to move relative to the main shaft.

4. The pivot module according to claim 1, wherein the main connecting member is used to rotate with a rotation axis as a center, the first driven portion comprises an inclined surface, the second driven portion abuts against the inclined surface, and an extension axis of the inclined surface is different from the rotation axis.

5. The pivot module according to claim 1, wherein one of the first linkage portion and the second linkage portion comprises an external thread, the other one of the first linkage portion and the second linkage portion comprises an internal thread, and the external thread is engaged with the internal thread.

6. The pivot module according to claim 1, wherein one of the first linkage portion and the second linkage portion comprises a spiral protrusion, the other one of the first linkage portion and the second linkage portion comprises a spiral groove, and the spiral groove is at least partially sleeved in the spiral protrusion.

7. The pivot module according to claim 1, wherein the sliding member comprises a sliding body, the first driven portion is a rod, and the rod is pivotally connected to the sliding body and the second driven portion of the movable member.

8. The pivot module according to claim 7, wherein the groove has an extension axis, and an extension axis of the rod is different from a direction of the extension axis of the groove.

9. An electronic device, comprising:

a first body;

a second body; and a pivot module, the second body is pivotally connected to the first body through the pivot module, the pivot module comprises:

a main shaft, comprising a first linkage portion and disposed at the first body;

a main connecting member, disposed at the second body and pivotally disposed on the main shaft, the main connecting member comprises a groove;

a sliding member, movably connected to the main shaft and the main connecting member, the sliding member comprises a second linkage portion and a first driven portion, the second linkage portion is contacted with the first linkage portion of the main shaft; and a movable member, comprising a second driven portion, the second driven portion is passed through the groove and contacted with the first driven portion, wherein the main connecting member is used to rotate relative to the main shaft and the sliding member is driven to move on the main shaft, causing the movable member is driven to move relative to the main shaft by the sliding member.

10. The electronic device according to claim 9, wherein one of the first linkage portion and the second linkage portion comprises a bottom surface and a top surface, and the other one of the first linkage portion and the second linkage portion comprises a protrusion, the main connecting member is used to rotate relative to the main shaft to cause the protrusion to abut against the bottom surface or the top surface, thereby causing the sliding member to move relative to the main shaft.

11. The electronic device according to claim 9, wherein the main connecting member is used to rotate with a rotation axis as a center, the first driven portion comprises an inclined surface, the second driven portion abuts against the inclined surface, and an extension axis of the inclined surface is different from the rotation axis.

12. The electronic device according to claim 9, wherein one of the first linkage portion and the second linkage portion comprises an external thread, and the other one of the first linkage portion and the second linkage portion comprises an internal thread, the external thread is engaged with the internal thread.

13. The electronic device according to claim 9, wherein one of the first linkage portion and the second linkage portion comprises a spiral protrusion, the other one of the first linkage portion and the second linkage portion comprises a spiral groove, and the spiral groove being at least partially sleeved in the spiral protrusion.

14. The electronic device according to claim 9, wherein the sliding member comprises a sliding body, the first driven portion is a rod, the second linkage portion is formed on the sliding body, and the rod is pivotally connected to the sliding body and the second driven portion.

15. The electronic device according to claim 14, wherein the groove has an extension axis, and an extension axis of the rod is different from a direction of the extension axis of the groove.

16. The electronic device according to claim 10, wherein the second body comprises a groove, the movable member comprises a third driven portion, the groove comprises a first portion and a second portion connected to each other, a first extension axis of the first portion is parallel to an extension axis of the groove of the main connecting member, a second extension axis of the second portion is different from the extension axis, the second driven portion is passed through the first portion, and the third driven portion is passed through the second portion.

17. The electronic device according to claim 16, wherein the first portion comprises a first end and a second end opposite to each other, the second portion comprises a third end and a fourth end opposite to each other, the second end is connected to the third end, when the electronic device is in a first state, the second driven portion is located at the first end, the third driven portion is located at the third end, when the electronic device is in a second state, the second driven portion is located at the second end, the third driven portion is located at the fourth end.

18. The electronic device according to claim 9, wherein the movable member is a media component.

19. The electronic device according to claim 9, wherein the movable member comprises a working surface, the first body comprises a heat dissipation hole, when the electronic device is in a first state, the working surface faces the heat dissipation hole, when the electronic device is in a second state, the working surface is away from the heat dissipation hole.

20. A pivot module, comprising:

a main shaft, comprising a first linkage portion;

a main connecting member, disposed on the main shaft, the main connecting member comprises a groove;

a sliding member, movably connected to the main shaft and the main connecting member, and comprises a second linkage portion and a first driven portion, the second linkage portion is contacted with the first linkage portion of the main shaft; and a movable member, comprising a second driven portion, the second driven portion is passed through the groove and contacted with the first driven portion, wherein the main connecting member is used to rotate relative to the main shaft and the sliding member is driven to move by the main shaft, and the second driven portion of the movable member is driven by the first driven portion of the sliding member, so that the movable member is rotated relative to the main shaft.

* * * * *